(12) United States Patent
Smith et al.

(10) Patent No.: US 6,272,121 B1
(45) Date of Patent: *Aug. 7, 2001

(54) SPREAD SPECTRUM COMMUNICATION SYSTEM USING DECT PROTOCOL

(75) Inventors: Douglas G. Smith, Arlington, VA (US); Robert C. Dixon, Palmer Lake, CO (US)

(73) Assignee: Omnipoint Corporation, Colorado Springs, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/811,108

(22) Filed: Mar. 3, 1997

(51) Int. Cl.[7] .................................................. H04B 7/216
(52) U.S. Cl. .................... 370/342; 370/277; 370/280; 370/294; 370/329; 375/347; 375/348; 455/450; 455/451; 455/452; 455/38.1
(58) Field of Search .................... 370/277, 280, 370/294, 329, 330, 335, 337, 342, 347, 350; 375/346, 347, 348, 130, 140, 141, 142, 145, 146, 147, 149, 150; 455/450, 451, 452, 38.1, 507, 509, 517

(56) References Cited

U.S. PATENT DOCUMENTS

| | | | |
|---|---|---|---|
| 4,418,393 | 11/1983 | Zachiele, Jr. ......................... | 364/724 |
| 4,688,210 | 8/1987 | Eizenhöfer et al. .................... | 370/18 |
| 5,042,082 | 8/1991 | Dahlin .................................... | 455/33 |
| 5,200,956 | 4/1993 | Pudney et al. ....................... | 370/95.1 |
| 5,241,690 | 8/1993 | Larsson et al. ...................... | 455/54.1 |
| 5,278,835 | 1/1994 | Ito et al. .............................. | 370/95.3 |
| 5,313,457 | 5/1994 | Hostetter et al. ...................... | 370/18 |
| 5,410,568 | 4/1995 | Schilling .............................. | 375/205 |
| 5,416,797 | 5/1995 | Gilhousen et al. ................... | 375/705 |

(List continued on next page.)

OTHER PUBLICATIONS

"Air Interface Consideration", Joint Experts Meeting, Rockwell Int'l. Nov. 9, 1992.

(List continued on next page.)

*Primary Examiner*—Alpus H. Hsu
(74) *Attorney, Agent, or Firm*—Lyon & Lyon LLP

(57) ABSTRACT

A time division multiplexed wireless communication system using the DECT protocol with spread-spectrum modulation. The wireless communication system includes a spread-spectrum transmitter and receiver. The spread spectrum transmitter transmits using an M-ary spread spectrum transmission technique, sending a predefined chip code (symbol code) for each data symbol. The predefined chip codes used are relatively short, so that spread spectrum synchronization is accomplished within about a single data symbol transmission time, well within the constraints of the DECT timing structure. The spread spectrum signal may be transmitted over a bandwidth of under 20 MHz (e.g., about 5 MHz) covering a plurality of DECT frequency channels, so as to be confined within, or overlapping with, the bandwidth of a DECT system, and so as to minimize interference with other users, if any, of the same frequency spectrum. A spread spectrum transmission in a DECT time slot may overlay one or more narrowband transmissions, or may overlay other spread spectrum transmissions. Code division multiplexing may also be used to allow multiple spread spectrum transmissions to be sent during a single DECT time slot.

29 Claims, 8 Drawing Sheets

U.S. PATENT DOCUMENTS

| | | | |
|---|---|---|---|
| 5,434,859 | | 7/1995 | Levardon ................................. 370/84 |
| 5,454,028 | | 9/1995 | Hara et al. .............................. 379/61 |
| 5,455,822 | | 10/1995 | Dixon et al. ........................... 370/18 |
| 5,467,367 | | 11/1995 | Izumi et al. .......................... 375/206 |
| 5,469,468 | | 11/1995 | Schilling ............................... 375/200 |
| 5,481,533 | | 1/1996 | Honig et al. ........................... 370/18 |
| 5,483,676 | | 1/1996 | Mahany et al. ..................... 455/67.4 |
| 5,490,136 | | 2/1996 | Sereno et al. ........................... 370/18 |
| 5,506,837 | | 4/1996 | Söllner et al. .......................... 370/31 |
| 5,511,067 | | 4/1996 | Miller .................................... 370/18 |
| 5,533,013 | * | 7/1996 | Leppanen .............................. 370/335 |
| 5,598,404 | * | 1/1997 | Hayashi et al. ...................... 370/342 |
| 5,732,076 | * | 3/1998 | Ketseoglou et al. ................. 370/280 |
| 5,737,324 | * | 4/1998 | Dixon et al. ......................... 370/342 |
| 5,742,583 | * | 4/1998 | Scott ..................................... 370/342 |
| 5,745,484 | * | 4/1998 | Scott ..................................... 370/347 |
| 5,802,046 | * | 9/1998 | Scott ..................................... 370/280 |

OTHER PUBLICATIONS

European digital cellular telecommunications system (phase 1); Mobile Station—Base Station System (MS–BSS) interface data link layer specification, I–ETS 300 021, May 1992.

European digital cellular telecommunications system (phase 2); Mobile Station—Base Station (MS–BSS) interface Data Link (DL) layer specification (GSM 04.06), ETS 300 555, Sep. 1994.

Gardner, Mike, "Testing for a New Technology," *Telecommunication*, Oct. 1993, pp. 51–53.

Mohanty, Nirode C., "Spread Spectrum and Time Division Multiple Access Satellite Communications", *IEEE Transactions on Communications*, Com–25(8):810–815, Aug. 1977.

Radio Equipment and Systems Digital European Cordless Telecommunications (DECT) Reference document, ETR 015, Mar. 1991.

Radio Equipment and Systems (RES); Digital European Cordless Telecommunications (DECT) Common interface services and facilities requirements specification, ETR 043, Jul. 1992.

Radio Equipment and Systems (RES); Digital European Cordless Telecommunications (DECT) Common interface Part 9: Public access profile, ETS 300 175–9, Oct. 1992.

Omnipoint Corporation—Omnipoint IS–661–Based Composite CDMA/TDMA PCS System Overview, Dated: Jun. 1995.

* cited by examiner

CODE CLOCK
DATA CLOCK
PULSE GENERATOR RESET
CODE
DATA
ENCODED DATA

SPREAD SPECTRUM COMMUNICATION SYSTEM USING DECT PROTOCOL

BACKGROUND OF THE INVENTION

1. Field of the Invention

The present invention relates to the field of wireless communication, and more particularly, to a time division multiplexed communication system using the DECT protocol with spread-spectrum modulation.

2. Background

Communication between remote devices generally requires a communication protocol which enables devices to resolve which of them may transmit at any given time and which of them is designated to receive at any given time. One such protocol which is known in the art is the Digital European Cordless Telecommunications System (DECT) protocol developed by the European Telecommunications Standards Institute (ETSI). The DECT protocol includes provision for time division multiplexing between a base station and a mobile users, with each time frame comprising a base transmission portion and a mobile transmission portion divided into time slots. During the base transmission portion, the base station transmits in each time slot to a mobile user, and during the mobile transmission portion each mobile user transmits in an assigned time slot back to the base station.

Further information regarding the DECT system may be found in publication ETR 015 (March 1991) published by ETSI.

The DECT protocol provides a known protocol for transmission and reception between remote devices and is particularly well suited to communication at high data rates. In addition to being a uniform standard in Europe, where it has been allocated a frequency band around the 1.88 to 1.9 GHz region, the DECT protocol has been tested, used and found to be robust, and there is a substantial installed base of devices and systems which utilize the DECT protocol in Europe.

It would therefore be advantageous to be able to make use of the DECT protocol in the United States. One problem, however, is that there is presently no electromagnetic spectrum specifically allocated to the DECT protocol in the United States. Users who wish to use the DECT protocol may attempt to communicate using a frequency band where other types of communication are licensed (and thus must be compatible with those other types of communication), or must use a frequency band allocated to unlicensed devices (e.g., the 902–928 MHz frequency band). Communication in an "unlicensed" band is subject to a number of problems, due in part to the shared usage of that part of the spectrum which is required by regulation. These problems may include interference from other communicating devices, low power allowed to transmitters, and sources of unpredictable loss, noise, and interference.

Certain other communication systems make use of a technology known as spread-spectrum communication, in which transmitted signals are spread across a frequency band which is wider than the bandwidth of the data being transmitted. In spread spectrum communication, a data signal is typically modulated with a pseudo-random chip code to generate a transmitted signal spread over a relatively wide bandwidth. The transmitted signal has a low spectral density and appears essentially as noise to those not knowing the chip code. Consequently, spread spectrum communication provides increased security of transmitted information and reduced interference with other sensitive radio equipment being used in the surrounding environment.

Due to the nature of the spread spectrum signal it is typically necessary at the receiver to despread the received spread spectrum signal to recover the original data. In one spread spectrum technique, for example, despreading of the spread spectrum signal is accomplished by correlating the received signal with a reference code matching the pseudo-noise code used in the transmitter to encode the data prior to transmission of the information. After initial correlation is achieved, it is generally necessary to maintain synchronization by tracking the incoming signal so as to keep it aligned with the local reference code. While spread spectrum communication has been implemented in a TDD environment (see, e.g., U.S. Pat. No. 5,455,822 issued Oct. 3, 1995), many existing spread spectrum systems would be unable to perform synchronization fast enough to effectuate communication between sender and user within the constraints of a time multiplexed environment.

SUMMARY OF THE INVENTION

The invention in one aspect provides for a time division multiplexed wireless communication system using the DECT protocol with spread-spectrum modulation. The wireless communication system comprises a spread-spectrum transmitter and receiver which are capable of synchronizing rapidly within the constraints of the DECT timing structure. According to the preferred techniques described herein, the spread spectrum transmitter transmits using an M-ary spread spectrum transmission technique, sending a predefined chip code (known as a symbol code) for each data symbol (a sequence of one or more data bits). The predefined chip codes used are relatively short, so that spread spectrum synchronization is accomplished within about a single data symbol transmission time, well within the constraints of the DECT timing structure.

Use of M-ary encoding allows an increase in data transmission bandwidth without a corresponding increase in transmission bandwidth. The spread spectrum signal may be transmitted over a bandwidth of under 20 MHz (e.g., about 5 MHz) covering a plurality of DECT frequency channels, so as to be confined within, or overlapping with, the bandwidth of a DECT system, and so as to minimize interference with other users, if any, of the same frequency spectrum. A spread spectrum transmission in a DECT time slot may overlay one or more narrowband transmissions, or may overlay other spread spectrum transmissions. Code division multiplexing may also be used to allow multiple spread spectrum transmissions to be sent during a single DECT time slot.

A preferred embodiment also comprises a multiple-user spread-spectrum system in which multiple access to a common communication medium is achieved. The system may be configured so as to be deployed in the 902 to 928 MHz frequency band, the 2400 to 2483.5 MHz frequency band, the microwave communication frequency bands, or frequency bands allocated for spread-spectrum industrial, scientific or medical uses ("ISM" frequency bands).

Other variations and embodiments are also described herein.

BRIEF DESCRIPTION OF THE DRAWINGS

The various objects, features and advantages of the present invention may be better understood by examining the Detailed Description of the Preferred Embodiments found below, together with the appended figures, wherein.

DETAILED DESCRIPTION OF PREFERRED EMBODIMENTS

Figure 1:
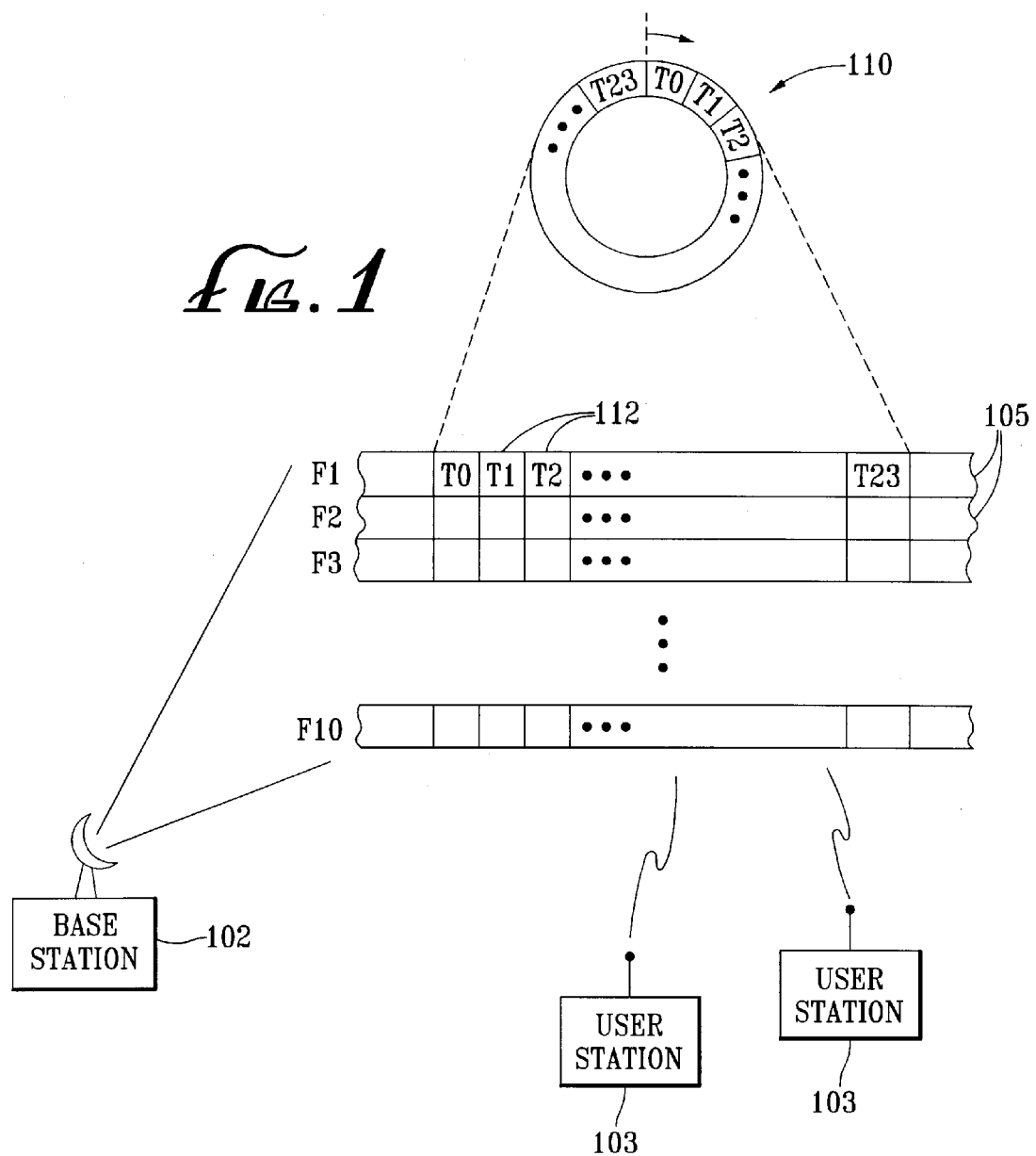
FIG. 1 is a diagram of the DECT radio frequency channel structure.

In Europe, the Conference Européenne des Postes et Télécommunication has allocated the 1880–1900 MHz frequency band to the DECT system. Within this bandwidth, DECT prescribes the use of ten radio frequency (RF) channels separated by 1.728 MHz as shown in FIG. 1, which is a diagram of the frequency channel structure of the DECT system. In FIG. 1 is shown a plurality (i.e., ten) of RF channels 105 by which a base station 102 may communicate with a plurality of user stations 103 using time division multiplexing. According to one aspect of the invention, not all of the RF channels 105 need be contiguous, so long as there are enough contiguous RF channels 105 to support the bandwidth of a transmitted spread spectrum signal, as discussed in more detail elsewhere herein.

Communication between the base station 102 and the user stations 103 in the DECT system is carried out using a time division multiplexing (TDM) technique. According to this technique, a timeline is divided into a plurality of time frames 110 (also occasionally referred to as polling loops), each ten milliseconds in length. Each time frame 110 in the DECT system is divided into twenty-four time slots 112 denoted consecutively T0, . . . T23, each 416.7 microseconds in length. The base station 102 communicates in a type of time division duplex with the user stations 103, using one time slot 112 for a forward link communication and another time slot 112 for a reverse link communication. A single base station 102 using ten RF channels 105 can thereby support duplex communication with up to 120 different user stations 103.

Figure 2:
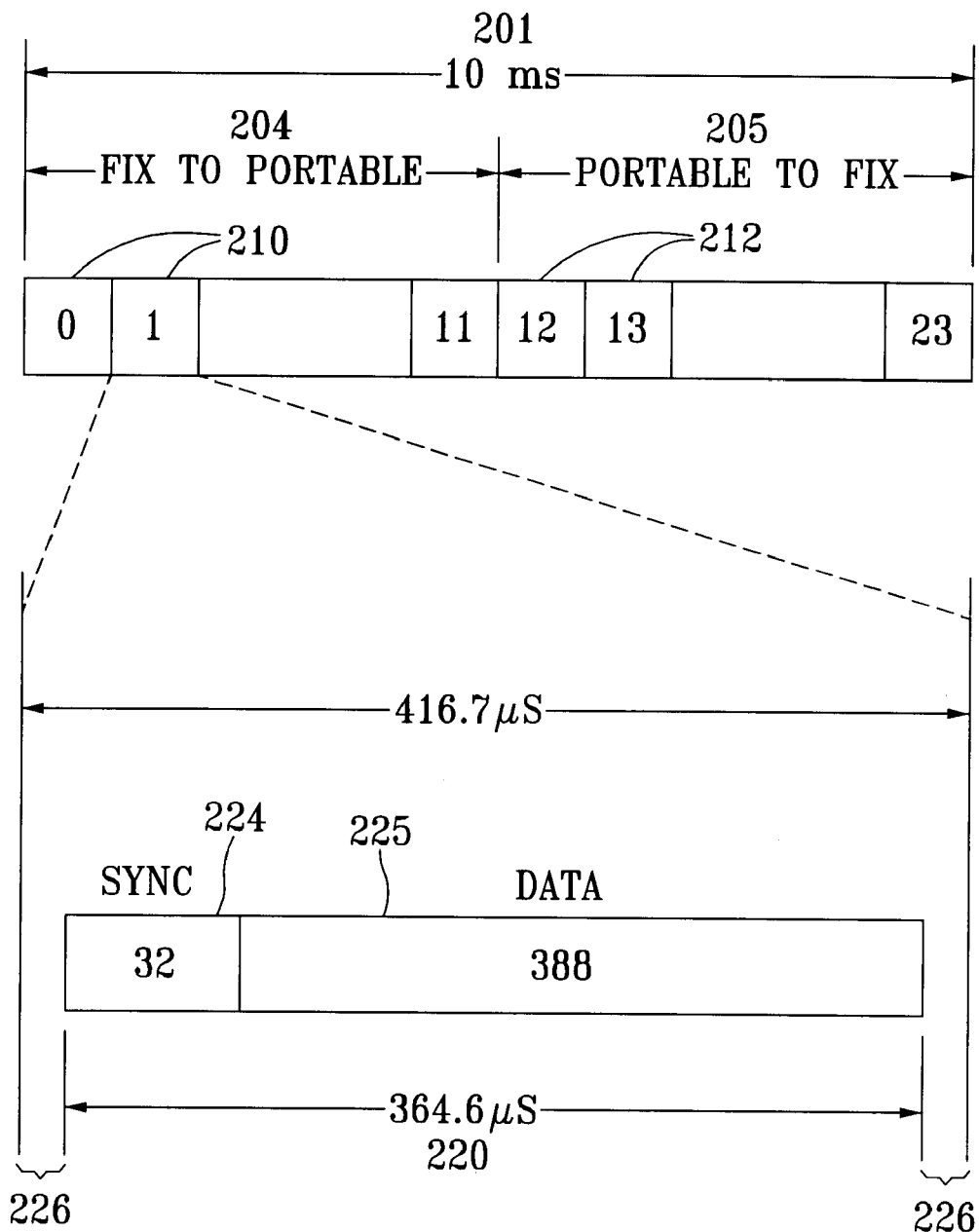
FIG. 2 is a diagram of the DECT time division structure for a particular radio frequency channel.

FIG. 2 is a diagram showing in more detail the DECT physical layer for a particular RF channel 105. As shown in FIG. 2, a time frame 201 (such as time frame 110 in FIG. 1) is divided into a base transmission portion 204 (or transmission burst) and a mobile transmission portion 205. The base transmission portion 204 is divided into twelve base time slots 210, during which the base station 102 transmits consecutively to the user stations 103 with which the base station 102 is in communication with over each RF channel 105. The mobile transmission portion 205 is divided into twelve mobile time slots 212, during which the user stations 103 generally respond to the base station 102 with reverse link transmissions. A single base time slot 210 and a single user time slot 212 thus together comprise a duplex channel whereby time division multiplexed communication is effectuated.

FIG. 2 further shows an exploded view of a base time slot 210 (the user time slot 212 is similar). The base time slot 210 comprises a physical layer (PHL) packet 220 of 364.6 microseconds duration. The PHL packet 220 comprises a sync portion 224 followed by a data portion 225. The sync portion 224 is used for synchronizing and preamble functions, while the data portion 225 carries data information. Guard bands 226 are provided to account for propagation and other delays as well as timing errors and the like. The total guard time of guard bands 226 is about 52.1 microseconds in each time slot 210 or 212.

Figure 3:
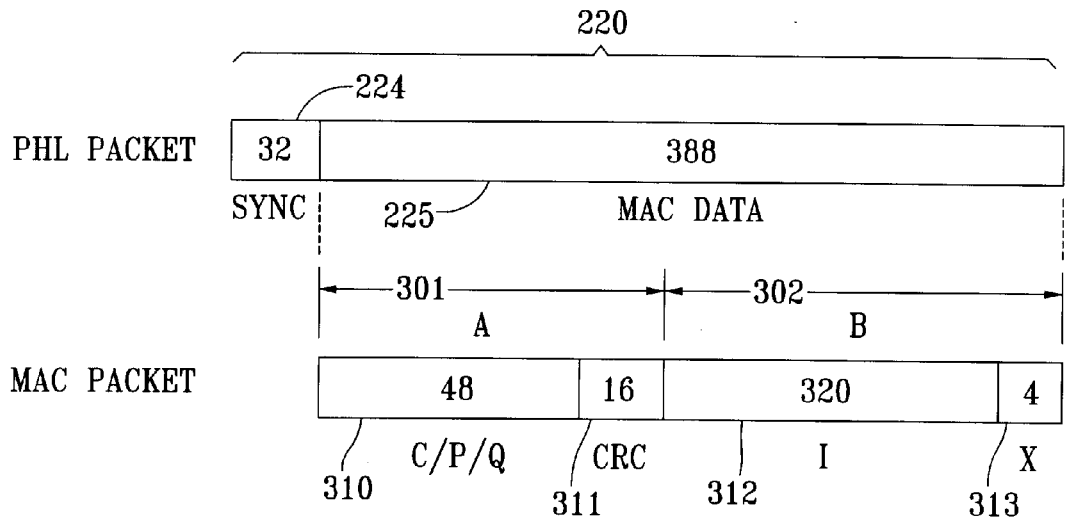
FIG. 3 is a diagram of a basic DECT physical data packet.

FIG. 3 is a diagram showing a further breakdown of the PHL packet 220. The data portion 225 of the PHL packet 220 comprises a signal data portion 301 (denoted the A-field) and a traffic data portion 302 (denoted the B-field). The signal data portion comprises a signal data field 310 followed by a CRC field 311. The traffic data portion 302 comprises a traffic data field 312 followed by an X field 313. The sync portion 224 is defined as 32 bits, and the data portion 225 is defined as 388 bits, for a total of 420 bits per PHL packet 220. Within the data portion 225, the signal data portion 301 is defined as 64 bits, and the traffic data portion 302 is defined as 324 bits. The signal data field 310 is defined as 48 bits; the CRC field is defined as 16 bits; the traffic signal portion is defined as 320 bits; and the X field is defined as 4 bits.

Figure 4:
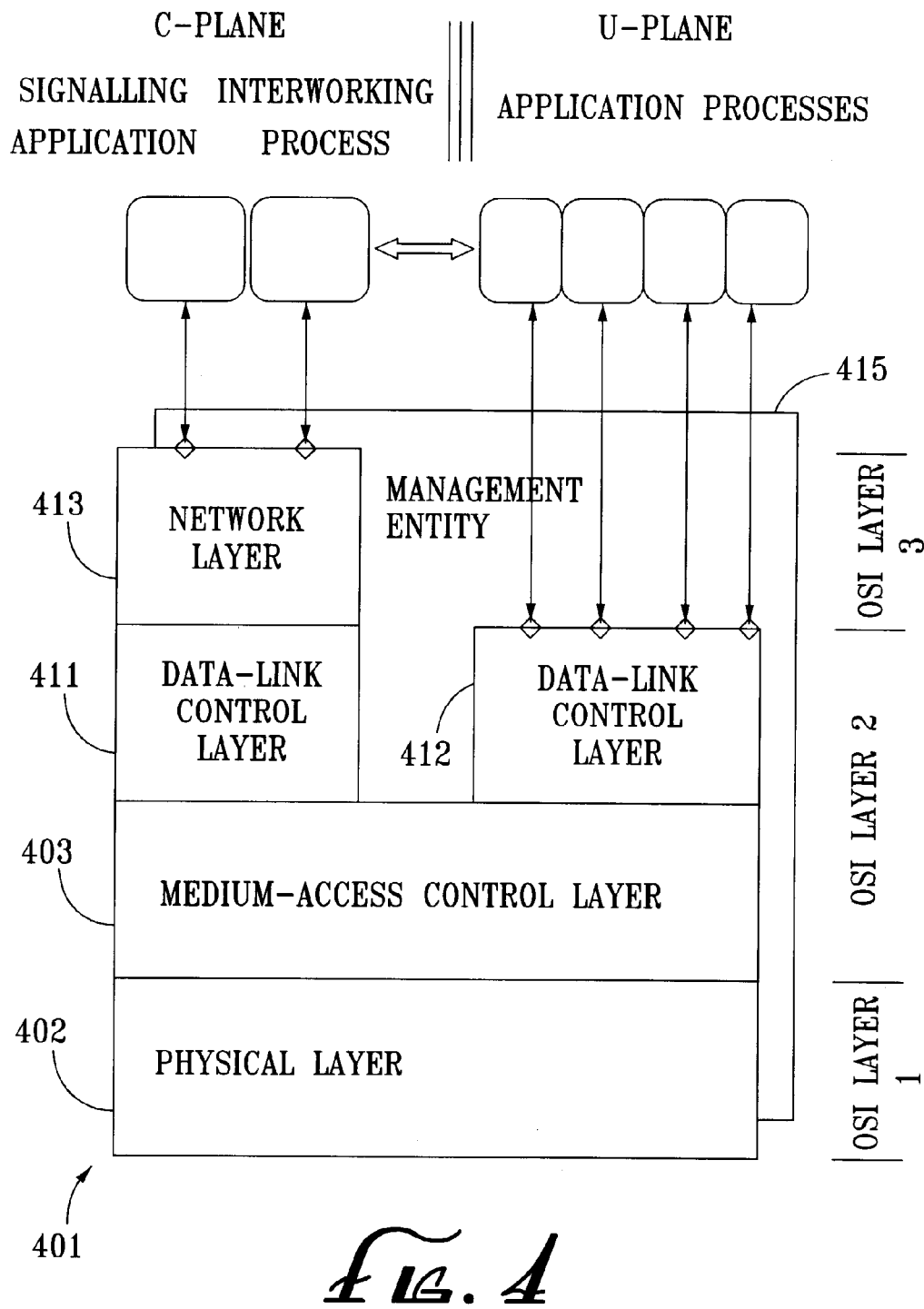
FIG. 4 is a diagram of the DECT layer structure.

FIG. 4 is an abstract diagram showing a high level DECT layer structure. A physical layer 402 interfaces with a medium-access control layer 403, which in turn interfaces with data-link control layers 411 and 412. The DECT system may be connected to a network via the network layer 413. A management entity 415 supports the DECT system. In general, the sync portion 224 of the PHL packet 220 is used by the physical layer 402 to facilitate proper reception of the transmitted signal, and the data portion 225 of the PHL packet 220 is passed on to the medium-access control (MAC) layer 403 for higher level processing.

Functions generally associated with the physical layer 402 include the creation of physical channels with fixed throughput, and observation of the radio environment to activate physical channels on the request of the MAC layer 403. The physical layer 402 generally operates to recognize attempts to establish a physical channel, to acquire and maintain synchronization between transmitters and receivers, and to notify the management entity 415 about the status (field strength, quality, etc.) of physical channels.

Functions generally associated with the MAC layer 403 include allocation of radio resources by activating and deactivating physical channels, and multiplexing of predefined logical channels onto the physical channels. These logical channels are four in number, and comprise a signaling channel (C-channel), a user information channel (I-channel), a paging channel (P-channel), and a broadcast channel (Q-channel). The logical channels are used for signaling traffic and for facilitating functions such as paging, handoff, and initial establishment of communication. The MAC layer 403 is also responsible for segmenting data frames received from an upper layer (e.g., a data-link control layer 411 or 412) for transportation as data packets over the physical layer 402 via one or more physical channels, and protecting the integrity of the data by carrying out cyclical redundancy checks and retransmitting if necessary.

The management entity 415 is generally associated with radio resource management, including the assignment of free channels or the assessment of the quality of received signals. The management entity 415 is also associated with mobility management, including, e.g., registration of user stations 102 into a network over the network layer 413, and for error handling, including the termination of a call in the case of interruption of a radio link.

Various embodiments of the present invention are directed to the physical layer 402 of the DECT system 401 and utilize spread spectrum technology to achieve certain advantages, including, e.g., high gain, reduction of interference, increased security, and the potential for background broadcasting. A spread spectrum signal is characterized by, among other things, a bandwidth exceeding the minimum bandwidth necessary to transmit the data. To generate a spread spectrum signal, as noted previously, a data signal can be modulated with a pseudo-random code which causes the modulated signal to have a Gaussian distribution and to appear noise-like to those not knowing the particular code used to spread the data signal. At the receiving end, the modulated signal may be despread by correlating the received signal with a locally generated version of the spread spectrum code.

Figure 5:
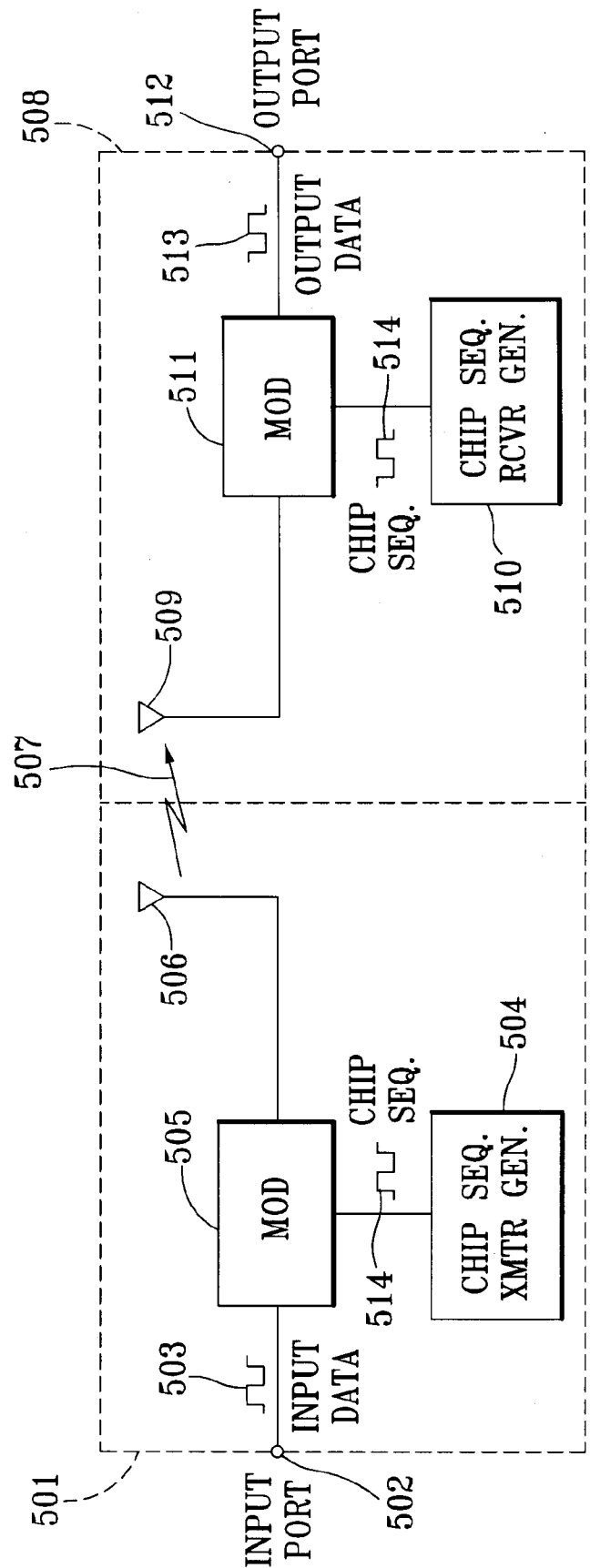
FIG. 5 is a block diagram of a spread-spectrum communication transmitter and receiver.

A spread spectrum transmitter and receiver are shown in FIG. 5. In FIG. 5, a spread-spectrum transmitter 501 comprises an input port 502 for input data 503, a chip sequence transmitter generator 504, a modulator 505, and a transmitting antenna 506 for transmitting a spread-spectrum signal 507. A spread-spectrum receiver 508 comprises a receiver antenna 509, a chip sequence receiver generator 510, a demodulator 511, and an output port 512 for output data 513. In operation, a single chip sequence 514 is identically generated by both the transmitter generator 504 and the receiver generator 510, and appears essentially random to others not knowing the spreading code upon which it is based. The spread-spectrum signal 507 is despread with demodulator 511 by correlating the received signal with a locally generated version of the chip sequence 514.

The DECT system 401 is in some aspects incompatible with spread spectrum communication in that the DECT system provides for a limited frequency bandwidth for transmission (around 20 MHz for all ten channels 105, or 1.728 MHz per channel 105 plus frequency guard bands), and requires rapid synchronization (within about 32 data bits or about 30 microseconds) in order to effectuate communication in a time slot. Many spread spectrum systems generally require at least a 200 MHz frequency bandwidth for operation, and require in the neighborhood of 90 milliseconds to accomplish synchronization. Such spread spectrum systems are therefore incompatible with the DECT timing protocol, or at least inefficient for use in the DECT environment. Because a DECT time slot 112 is only 416.7 microseconds in length, synchronization must be accomplished in well under that amount of time, and preferably within about 30 microseconds (i.e., the duration of the sync portion 224 of a PHL packet 220).

Figure 6A:
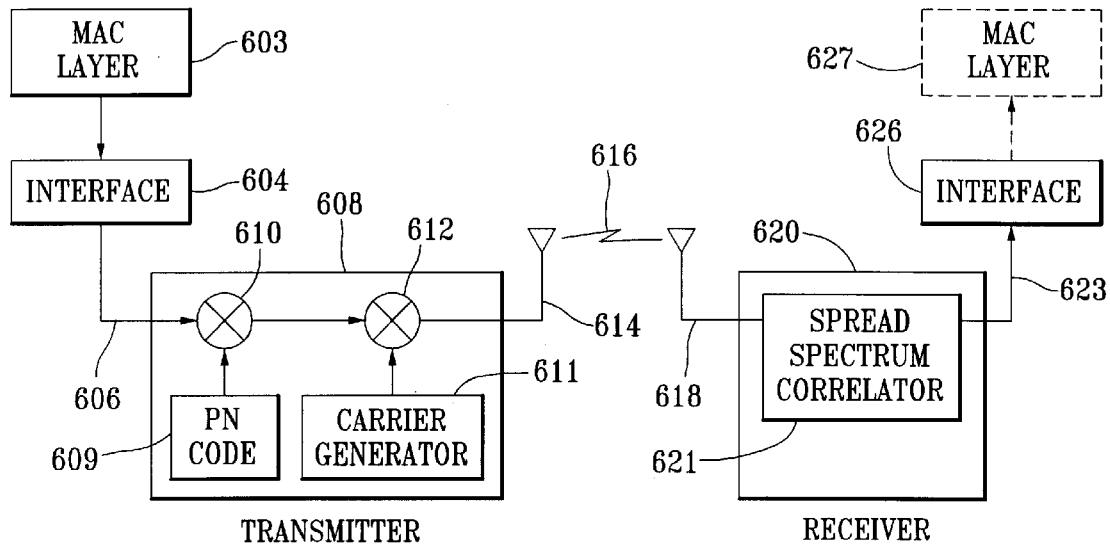
FIG. 6A is a block diagram of a DECT system using spread spectrum communication.

Embodiments of the invention disclosed herein overcome these limitations by providing a spread spectrum system that operates within the constraints of the DECT environment. One embodiment of the present invention is depicted in FIG. 6A, which is a block diagram of a DECT system employing a spread-spectrum communication transmitter and receiver. In FIG. 6A, a DECT medium-access control (MAC) layer 603 (e.g., MAC layer 403 shown in FIG. 4) is coupled to a data interface 604, which sends a data stream 606 of information to be transmitted to a spread-spectrum transmitter 608. The spread-spectrum transmitter comprises a chip sequence transmitter generator 609 (e.g., a feedback shift register code generator), a modulator 610, a carrier signal generator 611, and another modulator 612. The modulator 610 modulates the incoming data stream 606 with a chip stream output from chip sequence transmitter generator 609, thereby resulting in a spread spectrum signal. Modulator 612 modulates the output of modulator 610 with a carrier signal output from carrier signal generator 611. Transmitter 608 outputs a spread spectrum signal 614 having a center frequency defined in part by the carrier signal center frequency.

The spread spectrum signal 614 is communicated over a channel 616 and is received by a receiver 620. The receiver comprises a spread spectrum correlator 621, which despreads the received spread spectrum signal 618 and outputs a data stream 623. The data stream 623 may be provided to a data interface 623 and thereafter to a MAC layer 627 (e.g., MAC layer 403 as shown in FIG. 4). The spread spectrum communication by which data is transmitted and received over channel 616 is therefore generally transparent to the MAC layer 603, 627.

Figure 7:
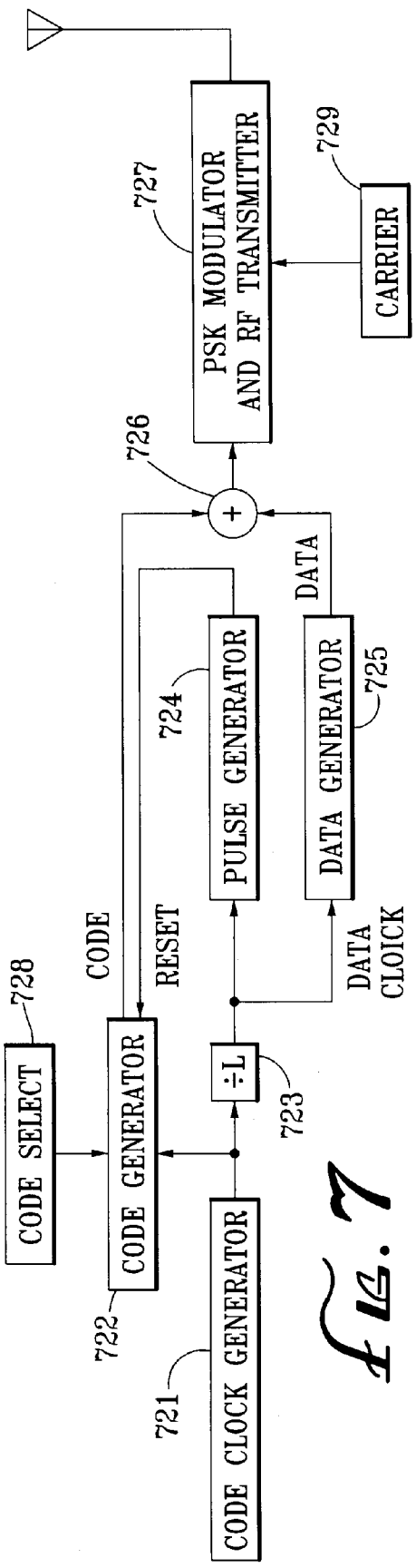
FIG. 7 is a detailed block diagram of a spread spectrum transmitter for use in a DECT system adapted for spread spectrum communication.

FIG. 7 is a block diagram showing in more detail an exemplary spread spectrum transmitter (e.g., transmitter 608) for use in the FIG. 6A communication system. As illustratively shown in FIG. 7, a transmitter 701 includes a code clock generator 721, a code selector 728, a code generator 722, a code clock divider 723, a pulse generator 724, a data generator 725, a modulo-2 adder 727, a carrier 729, and a phase shift keyed (PSK) modulator and RF transmitter 727. The code clock generator 721 generates a clock signal which is fed to the code generator 722 and to the clock divider 723. Using clock divider 723, the code and the data of the transmitter 727 are synchronized, with the code clock frequency being a multiple equal to the code length, L, of the data clock frequency thereby allowing one data bit per PN code sequence of length L. The data clock signal from code clock divider 723 is fed to the pulse generator 724 and to the data generator 725. The data generator 725 is the source of the data signal to be transmitted over the communication channel. The output signal of the pulse generator 724 is fed to the code generator 722 which thereby generates a PN code chosen by code selector 728. The PN code, which may be recursively generated by means of a feedback shift register, is then fed out to the modulo-2 adder 726. The output of the code generator 722 is modulo-2 added by modulo-2 adder 726 with the data output from the data generator 725. The output of modulo-2 adder 726 is phase shift keyed modulated with a carrier 729 in PSK modulator and RF transmitter 727.

Figure 10:
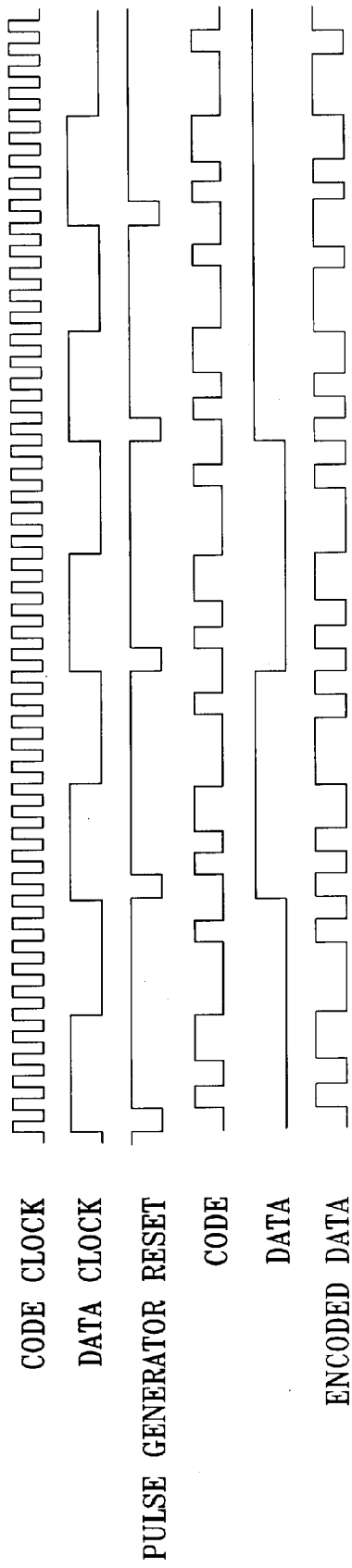
FIG. 10 is a signal timing diagram in accordance with an embodiment of the present invention.

An example of the timing of the code and clock signals of the FIG. 7 transmitter is shown in FIG. 10. The timing diagram illustrates a code clock signal, a data clock signal which is the code clock signal divided by the length of code, L, pulse generator reset signal, and the code signal, the data signal, and the encoded data signal. The code signal, when modulo-2 added with the data signal, produces the encoded data signal, and when modulated thereafter by an RF carrier produces a spread spectrum signal for transmission over a communication channel.

Figure 6B:
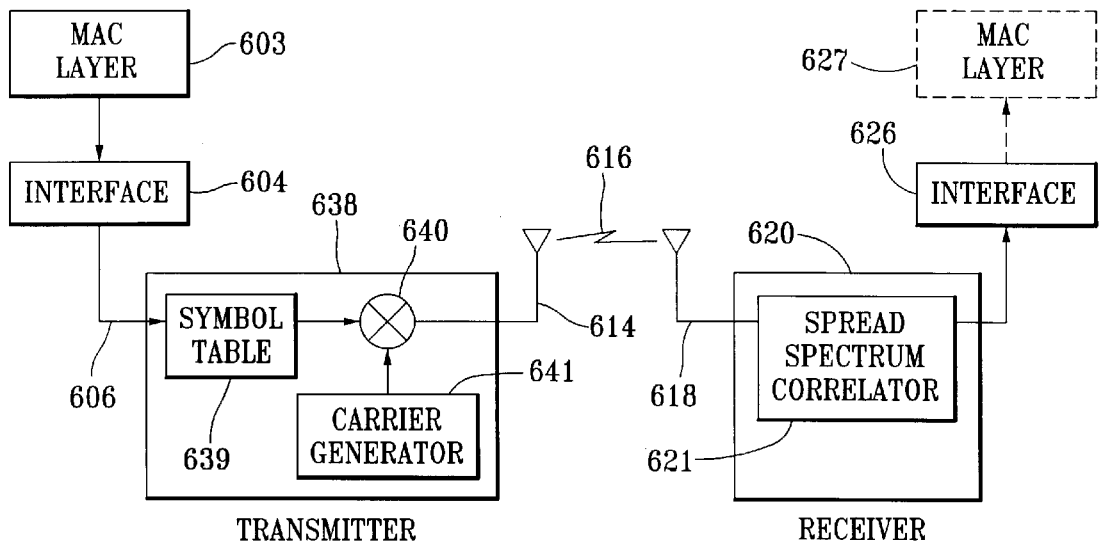
FIG. 6B is an alternate embodiment of a DECT system using spread spectrum communication.

An alternative embodiment of a DECT communication system is shown in FIG. 6B, which is similar to the communication system of FIG. 6A except that a different spread spectrum transmitter 638 is used in place of transmitter 608.

The spread spectrum transmitter 638 of FIG. 6B applies the incoming data stream 606 to a symbol code lookup table 639. The symbol code lookup table 639 stores a plurality of codewords. Each of the codewords comprises a predefined pseudo-random chip sequence corresponding to one or more data bits to be transmitted using an M-ary transmission technique.

The number of codewords necessary depends upon the number of data bits to be transmitted per codeword. For example, to send one data bit per codeword, two codewords would be necessary—a first codeword to represent a binary "1" value and another codeword to represent a binary "0" value. As another example, to send two data bits per codeword, four codewords are necessary, each of the four codewords representing one of the four combinations of data bits 00, 01, 10, and 11. Similarly, to send three data bits per codeword, eight codewords are required, and so on, where up to N data bits may be transmitted using $2^N$=M codewords.

In a preferred embodiment, a 32-ary transmission technique is used, wherein 32 different symbol codes are used to transmit 5 bits of information each. In addition, the phase of each symbol code is also preferably encoded or modulated so as to convey an additional bit of information, for a total of 6 bits of information per symbol code. A preferred method for phase encoding and decoding spread spectrum signals is disclosed in U.S. Pat. No. 5,757,847 issued May 26, 1998 which is hereby incorporated by reference as if fully set forth herein. Each symbol code is preferably 32 chips in length. A presently preferred family of symbol codes appears in Table 6-1 below.

TABLE 6-1

| Symbol | Symbol Code (Hex) | Symbol | Symbol Code (Hex) |
| --- | --- | --- | --- |
| 00 | 0544D65E | 10 | 0E4424A1 |
| 01 | 5B118E0B | 11 | 5B1171F4 |
| 02 | 3D77E66D | 12 | 3D771792 |
| 03 | 6822BD36 | 13 | 682242C7 |
| 04 | 014BD451 | 14 | 014B2BAE |
| 05 | 541E8104 | 15 | 541E7EFB |
| 06 | 3278E762 | 16 | 3278189D |
| 07 | 672DB237 | 17 | 672D4DC8 |
| 08 | 0EBBDBA1 | 18 | 0EBB245E |
| 09 | 5BEE8EF4 | 19 | 5BEE710B |
| 0A | 3D88E892 | 1A | 3D86176D |
| 0B | 68DDBDC7 | 1B | 68DD4238 |
| 0C | 01B4D4AE | 1C | 01B42B51 |
| 0D | 54E181FB | 1D | 54E17ED4 |
| 0E | 3287E79D | 1E | 32671862 |
| 0F | 67D2B2C8 | 1F | 67D24D37 |

In order to perform synchronization and despreading of the spread spectrum signal within the time constraints imposed by the DECT timing structure, the correlator 621 in one embodiment of the invention comprises an asymmetric spread spectrum correlator such as disclosed and described in U.S. Pat. No. 5,016,255 (issued May 14, 1991), which is hereby incorporated by reference as if fully set forth herein. In this embodiment, an entire pseudo noise code sequence is transmitted for each data bit of the data stream 606, so that synchronization or correlation occurs within each bit transmitted. This approach overcomes the barrier presented by the short synchronization time provided by the DECT timing structure.

In another embodiment of the invention, the correlator 621 comprises a spread spectrum correlator such as disclosed and described in U.S. Pat. No. 5,022,047 (issued Jun. 4, 1991), which is hereby incorporated by reference as if fully set forth herein. In this embodiment, an entire pseudo noise code sequence is likewise transmitted for each data bit of the data stream 606, so that synchronization or correlation occurs within each bit transmitted.

In another embodiment of the invention, the correlator 621 comprises a spread spectrum correlator such as disclosed in U.S. Pat. No. 5,757,847 issued May 26, 1998, previously incorporated by reference herein. In this embodiment, an entire pseudo noise code sequence (a symbol code) is transmitted for each group of data bits (e.g., five data bits) of the data stream 606. A sixth bit is also sent for each symbol code (except the first) by differential phase encoding, as described further in U.S. Pat. No. 5,757,847 issued May 26, 1998.

In another embodiment of the invention, the correlator 621 comprises a spread spectrum correlator such as disclosed in U.S. Pat. No. 5,761,239 filed on Jun. 2, 1998, which is hereby incorporated by reference as if fully set forth herein. This type of correlator does not require the generation of a local reference of the chip code in the receiver 620, and also results in rapid synchronization.

Figure 8:
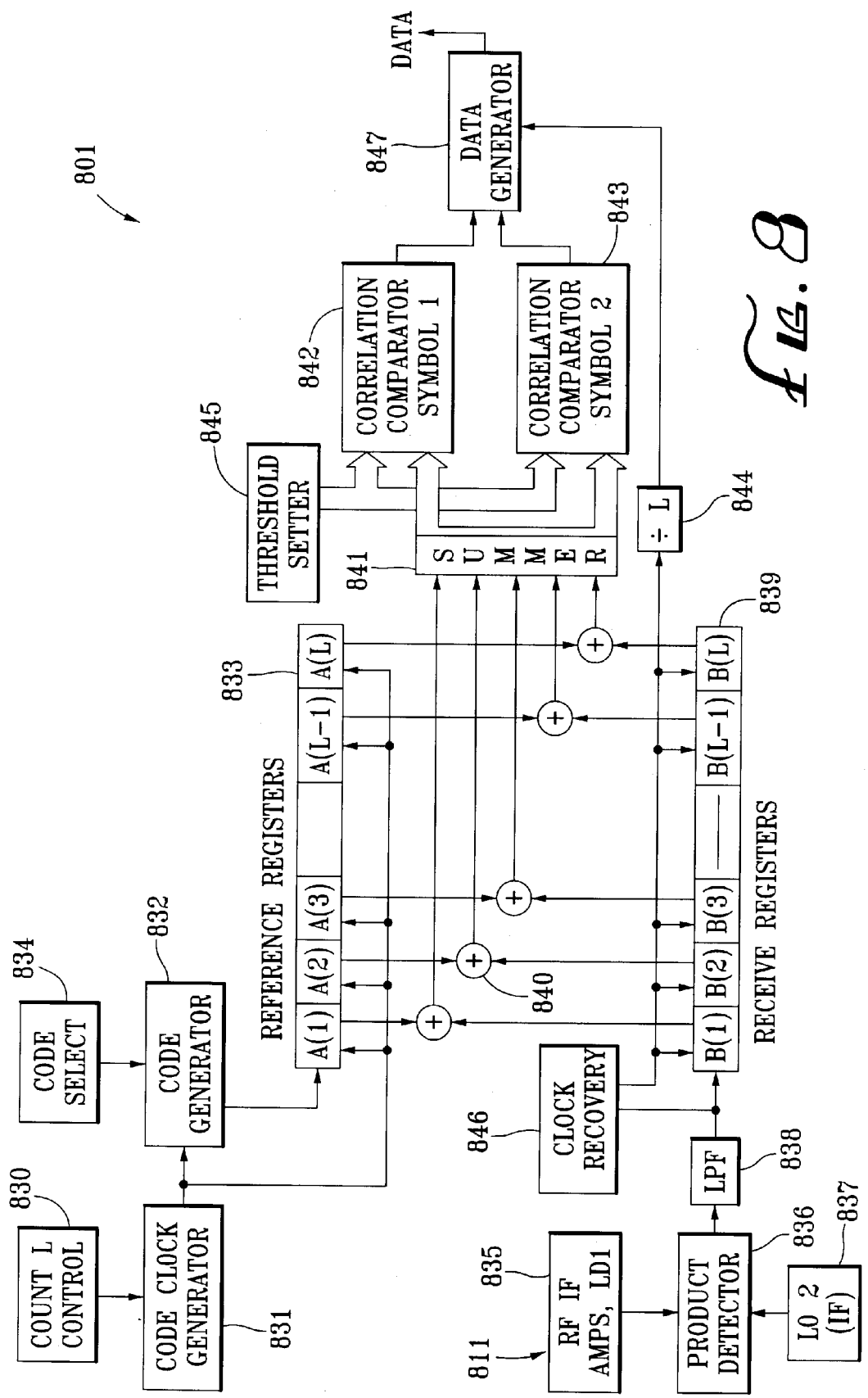
FIG. 8 is a detailed block diagram of a spread spectrum receiver for use in a DECT system adapted for spread spectrum communication.

FIG. 8 is a detailed block diagram of a particular spread spectrum receiver and correlator for use in either the FIG. 6A or FIG. 6B embodiments.

In FIG. 8, a received spread spectrum signal 811 (e.g. signal 618 in FIG. 6A or FIG. 6B) is provided to a correlator 801. The correlator 801 comprises a count control 830 coupled to a code clock generator 831, which is connected to a code generator 832 and reference registers 833. The code generator 832 is also connected to the reference registers 833. A code selection circuit 834 is coupled to code generator 832. The count control 830 controls the length of the particular pseudo-noise signal (i.e., spread spectrum code) chosen by code selection circuit 834 to be detected by the receiver, and outputs signals to the code clock generator 831 which causes the code generator 832 to output a code of length L to first reference registers 833. Count control 830 triggers code clock generator 831 which thereby triggers code generator 832 and first reference registers 833. Code generator 832 outputs the particular pseudo-noise signal to first reference registers 833 as determined by a code selection circuit 834. The code selection circuit 834 can provide signals to the code generator 832 which enable it to scan through a plurality of pseudo noise codes. In operation, a single code can be loaded into the first reference registers 833 or, in a scanning mode, the first reference registers 833 can be periodically loaded with constantly varying codes until a match to a received code occurs.

The input signal 811 is coupled to an amplifier circuit 835, which may comprise one or more RF or IF amplifiers depending on the characteristics of the input signal 811. The amplifier circuit 835 is coupled to a product detector 836, which is coupled to a local oscillator 837 and a low pass filter 838. The low pass filter 838 is coupled to receive registers 839 and clock recovery circuit 846.

For the case of a correlator having a dual threshold capability, the first reference registers 833 store a first pseudo-noise signal, and the receive registers 839 store the input spread spectrum signal. The first adders 840 compare each chip of the received spread spectrum signal with each respective chip of the first pseudo-noise signal to generate a first plurality of chip-comparison signals. The first summer 841 adds the first plurality of chip-comparison signals and thereby generates a first correlation signal. In response to the first correlation signal being greater than the upper-threshold level, the comparator 842 generates a first data-symbol signal. In response to the first correlation signal being less than the lower-threshold level, the comparator 842 generates a second data-symbol signal.

In operation, an input spread spectrum signal 811 having a data signal modulated with a pseudo-noise signal would be stored in receive registers 839 and the entire length, L, of a first spread spectrum code is stored in first reference registers 833. Each chip of the input pseudo-noise signal is modulo-2 added by each respective chip of the first reference pseudo-noise signal by first adders 840. This modulo addition of the two signals thereby generates a first plurality of chip-comparison signals which is transferred from first adders 840 to first summer 841. The first summer 841 adds the first plurality of signals to generate a first correlation signal.

The first symbol comparator 842 and second symbol comparator 843 are coupled to the first summer 841. The comparators 842, 843 have an upper-threshold level and a lower-threshold level. In response to the first correlation signal being greater than the upper-threshold level, the first symbol comparator 842 generates a first data-symbol-correlation signal. In response to the first correlation signal being less than the lower-threshold level, the second symbol-comparator 843 generates a second data-symbol-correlation signal. Data generator 847 thereby generates first or second data symbols, per the first or second data-symbol-correlation signal, respectively. The first and second data-symbol signals may be, respectively, 1-bit and 0-bit data signals.

In a preferred embodiment, as previously noted, each pseudo-noise code (FIG. 6A) or symbol code (FIG. 6B) is thirty-two chips in length. Because each data burst in the DECT protocol is 364.6 microseconds, and comprises 420 bits of information, data is sent at approximately 1152 kilobits/second. Accordingly, a preferred system has a chipping rate of at least 7.372 MChips/second (mega-chips per second) where five bits of information are transmitted per symbol code period, or 6.143 MChips/second where six bits of information are transmitted per symbol code period (e.g., using single-bit phase encoding with five bits per symbol, or alternatively, using six bits per symbol in a 64-ary transmission technique).

Because of the relatively high symbol transmission rate required, it may not be possible to contain the bandwidth of the transmitted signal within the bandwidth allocated for a single DECT 1.728 MHz frequency channel. Using a BPSK modulation technique with six bits transmitted per symbol, for example, a bandwidth of at least 6.143 MHz would theoretically be required, while in a practical implementation a bandwidth of about one-and-a-half times that, or 9 MHz, may be required. Using a quadrature phase shift keyed (QPSK) modulation technique, a bandwidth of at least 3.071 MHz would theoretically be required, while in practical implementation a bandwidth of about 4.6 to 4.9 MHz may be required. An alternative transmission technique having roughly the same bandwidth requirements as QPSK in this context is disclosed in copending U.S. Pat. No. 5,548,253 issued Aug. 20, 1996, and is hereby incorporated by reference as if fully set forth herein. Higher order PSK modulation may also be used. For example, using an 8-PSK modulation technique a bandwidth of 2.03 MHz or more would be required, and using a 16-PSK modulation technique a bandwidth of 1.6 MHz or more would be required.

It therefore may be possible, using a 16-PSK or greater phase shift keying modulation technique, to contain the transmitted spread spectrum signal within a single DECT 1.728 MHz frequency channel. However, high order PSK techniques may be complicated or difficult to achieve. In a preferred embodiment of the present invention, the transmitted spread spectrum signal occupies more than a single DECT frequency channel or more than a single DECT time slot.

Figure 9:
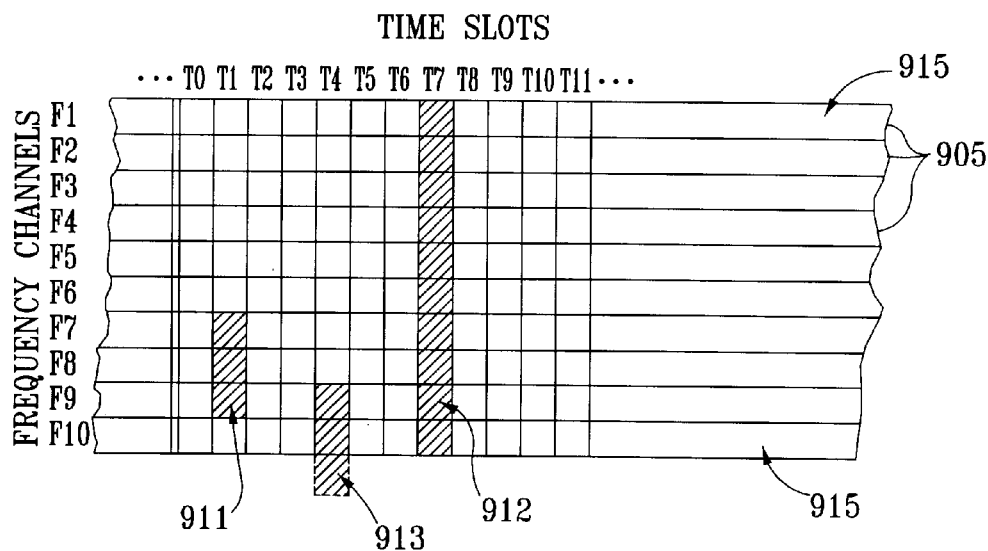
FIG. 9 is a frequency spectrum diagram showing an overlay of spread spectrum signals of various bandwidths with respect to a DECT RF channel structure.

In a first preferred embodiment, the transmitted spread spectrum signal occupies a plurality of DECT frequency channels, according to the bandwidth necessary to contain the spread spectrum signal. FIG. 9 is a frequency spectrum diagram showing an overlay of spread spectrum signals of various bandwidths with respect to DECT frequency channels 905. As noted previously, the DECT system provides for ten DECT frequency channels 905, and according to certain aspects of the present invention these frequency channels 905 need not be contiguous. Preferably, the DECT frequency channels 905 are situated so that a plurality of contiguous frequency channels 905 collectively have sufficient bandwidth to contain the transmitted spread spectrum signal.

In one embodiment, a QPSK modulation technique is used as described above to transmit 6.143 Mchips/second, requiring a practical bandwidth of almost 5 MHz. Accordingly, a 5 MHz bandwidth spread spectrum signal 911 covers three contiguous frequency channels 905 for the duration of a DECT time slot 112. Due to the relatively low power of the spread spectrum transmission, the spread spectrum signal does not unduly interfere with the DECT communications in the same time slot 112 in the overlaid frequency bands.

To further reduce the possibility of interference from the transmitted spread spectrum signal, the spread spectrum signal may be spread over a wider bandwidth, such as the entire 17 MHz or more spectrum allocated to the ten frequency channels 905, assuming the frequency channels 905 are contiguous. Spread spectrum signal 912 in FIG. 9 illustrates such a case. The wider bandwidth spread spectrum signal has less peak transmitted power and therefore is generally a lesser source of potential interference for other users of the same spectrum.

The center frequency for transmission is selected by carrier generator 611 (FIG. 6A) or 641 (FIG. 6B), so as to overlay the appropriate DECT frequency channels 905. For example, a DECT system could be deployed in the 1880 to 1900 MHz bandwidth range and be configured to have ten channels have center frequencies separated by about 1.7 megahertz each—e.g., at 1882.3 MHz, 1884 MHz, 1885.7 MHz, and so on (selecting about a 1.5 MHz frequency guard band at each end of the total bandwidth range). The spread spectrum center frequency may be selected, e.g., so as to cover any three of the DECT frequency channels 905. As an illustration, the spread spectrum center frequency may be selected at 1884 MHz, and thus covers from about 1881.5 MHz to about 1886.5 MHz, or about three channels.

The spread spectrum signal may also be transmitted partially outside of the bandwidth allocated to the DECT system, due to the low power, low interference properties of some spread spectrum signals. Thus, for example, the spread spectrum signal may be centered at a border frequency channel 915, and have a majority (i.e., a little more than half) of its bandwidth contained within the DECT frequency channels 905, and the remainder of its bandwidth falling outside of the border frequency channel 915 in, e.g., an unlicensed portion of the spectrum. Spread spectrum signal 913 in FIG. 9 illustrates such a case. However, there may be circumstances in which uses of the neighboring spectrum prohibit transmission outside of the frequency spectrum allocated to the DECT system. In such a case, the spread spectrum signal should be contained entirely within the allocated DECT frequency spectrum.

In a second preferred embodiment, the transmitted spread spectrum signal occupies a single DECT frequency channel 105, but occupies a plurality of DECT time slots 112. In particular, a base station 102 transmits using a plurality of base time slots 210, and a user station 103 transmits using a plurality of user time slots 212. In a particular embodiment, a QPSK transmission technique is used to transmit 2.048 Mchips/second of information in each of three time slots 210 or 212 (depending on whether the signal is transmitted from the base station 102 or the user station 103) in a single time frame 110 over a single DECT frequency channel 105. The three time slots 210 or 212 need not be contiguous. Thus, a total of 13,440 chips or 420 bits of information is transmitted in a single time frame 110, thereby meeting the data rate required of a single time frame transmission for the DECT system.

In a third preferred embodiment, a spread spectrum signal is transmitted for each of the ten communication channels during a given time slot 112. Each spread spectrum signal covers, for example, all ten contiguous DECT frequency channels 905—e.g., each spread spectrum signal has a bandwidth as shown for signal 913 in FIG. 9. Interference among the spread spectrum signals is minimized by code division multiplexing so that the system carries out code division multiple access (CDMA), a concept known in the art of spread spectrum communication. Preferably, a different code group is used for each spread spectrum code on a different communication channel, and the ten code groups (each comprising thirty-two spread spectrum codes in a 32-ary system, for example) are selected so as to be orthogonal. A code group for a particular user station 103 may be assigned at the time communication is established, so that only one code group is used at a time during a given time slot 112.

If a smaller spreading bandwidth is used (e.g., 5 MHz), then fewer code groups may be needed, so long as the code groups for two or more different channels utilizing overlapping frequency bands are not the same.

Spread spectrum signals 911, 912 or 913 are in one embodiment transmitted in place of any narrowband signals in the time slots and over the frequency channels occupied by the spread spectrum signal 911, 912 or 913. Alternatively, spread spectrum signals 911, 912 or 913 overlay narrowband signals transmitted in the same time slots and same frequency channels occupied by the spread spectrum signal 911, 912 or 913. The narrowband signals may be signals transmitted as part of the DECT protocol and system in which the spread spectrum signal is transmitted; alternatively, the narrowband signal may he associated with a different system and protocol, and the spread spectrum signal will in such a case overlay narrowband signal and generally avoid interference due to its low power spread-spectrum characteristics.

Use of spread spectrum communication therefore provides for reduced interference with other users of the spectrum, and possible coexistence with other users (e.g., narrowband users). Use of spread spectrum communication also provides for potentially increased capacity where code division multiplexing is used to allow for multiple simultaneous users. The preferred embodiments as disclosed herein allow for transmission of information in a DECT format within the constraints of the DECT timing protocol, while employing an alternative physical channel that reduces interference and the effects of noise.

The inventions disclosed herein may be used in conjunction with inventions described or shown in U.S. Pat. No. 5,455,822 entitled "Method and Apparatus for Establishing Spread Spectrum Communications," which is hereby incorporated by reference as if fully set forth herein. In particular, the above-referenced patent describes techniques suitable for use in a time multiplexed environment for establishing spread spectrum communication according to a certain handshake protocol.

While the present invention has been set forth in the form of its preferred embodiments, many variations and modifications are possible which remain within the scope and spirit of the invention. Such variations or modifications will become clear to one of ordinary skill in the art after inspection of the specification and drawings herein. Moreover, such variations and modifications are considered to be within the purview of any appended claims.

What is claimed is:

1. A method of communicating comprising the steps of transmitting from a base station, during a DECT (Digital European Cordless Telecommuncation System) base station time slot of a DECT time frame, by modulating a base station data stream with a chip stream output of a chin sequence transmitter generator to provide rapid synchronization in compliance with DECT system timing constraints, a first spread spectrum signal to a user station;

receiving said first spread spectrum signal at said user station;

transmitting from said user station, during a DECT mobile station time slot of said DECT time frame, by modulating a user station data stream with a chip stream output of a chip sequence transmitter generator to provide rapid synchronization in compliance with DECT system timing constraints, a second spread spectrum signal to said base station; and receiving said second spread spectrum signal at said base station.

2. The method of claim 1 wherein said DECT base station time slot and said DECT mobile station time slot are in the same said DECT time frame.

3. The method of claim 2 wherein said first spread spectrum signal is transmitted during a base station portion of said DECT time frame and wherein said second spread spectrum signal is received in a mobile station portion of said DECT time frame, said method further comprising the steps of transmitting a first plurality of signals from said base station to a plurality of user stations during said base station portion, one in each of a plurality of base station time slots;

receiving said first plurality of signals at said user stations;

transmitting a second plurality of signals from said user stations to said base station; and receiving said second plurality of signals during said mobile station portion, one in each of a plurality of user station time slots.

4. The method of claim 1 wherein said step of transmitting said first spread spectrum signal and said step of transmitting said second spread spectrum signal each comprises the step of transmitting one data symbol for each one of a plurality of spread spectrum symbol codes.

5. The method of claim 4 wherein each of said spread spectrum symbol codes is no more than 32 chips in lenght.

6. The method of claim 4 further comprising the steps of transmitting, simultaneously with said steps of transmitting said first spread spectrum symbol code, a first narrowband signal to a second user station during said DECT base station time slot, and transmitting, simultaneously with said step of transmitting said second spread spectrum symbol code, a second narrowband signal from said second user station during said DECT user station time slot, said first narrowband signal having a first bandwidth lying within bandwidth of said first spread spectrum signal, and said second narrowband signal having a second bandwidth lying within bandwidth of said second spread spectrum signal.

7. The method of claim 1 wherein said first spread spectrum signal and said second spread spectrum signal are each wider than 1.728 Megahertz in bandwidth.

8. A method of communicating comprising the steps of receiving a data stream in a DECT (Digital European Cordless Telecommunication System) format;

encoding said data stream in a spread spectrum format and generating an encoded spread spectrum signal by modulating said data stream with a chip stream output of a chip sequence transmitter generator to provide rapid synchronization in compliance with DECT system timing constraints;

transmitting said encoded spread spectrum signal during a DECT time slot;

receiving said encoded spread spectrum signal; and correlating said received spread spectrum signal to recover said data stream in a rapid synchronization manner in compliance with DECT system timing constraints.

9. The method of claim 8 wherein said data stream comprises a plurality of data symbols;

wherein said step of encoding said data stream comprises the step of encoding said data symbols; and wherein said step of correlating said received spread spectrum signal comprises the step of synchronizing to said received spread spectrum signal after receiving less than two encoded data symbols.

10. The method of claim 8 wherein said step of encoding said data stream comprises the step of selecting one of a plurality of spread spectrum symbol codes for each predetermined portion of said data stream.

11. The method of claim 8 further comprising the step of transmitting a narrowband signal during said DECT time slot, said narrowband signal contained within the same bandwidth as said encoded spread spectrum signal.

12. The method of claim 8 wherein said encoded spread spectrum signal has a bandwidth exceeding 1.728 Megahertz.

13. A communication system comprising:

a series of time frames in DECT (Digital European Cordless Telecommunication System) protocol for communication between a base station and a plurality of user stations, each of said time frames comprising a base station portion and a user station portion;

a plurality of base station time slots in said base station portion, during each of which said base station may transmit a base-to-user signal to one of said user stations, said base station including a chip sequence transmitter generator that produces a chip stream output, and a modulator to modulate a base station data stream with said chip stream output to provide rapid synchronization within DECT system timing constraints; and a plurality of user station time slots in said user station portion, during each of which one of said user stations may transmit a user-to-base signal to said base station, each of said user stations including a chip sequence transmit generator that produces a chip steam output, and a modulator to modulate a user station data stream with said chip stream output to provide rapid synchronization within DECT system timing constraints;

wherein at least one of said user stations communicates with said base station with spread spectrum transmissions overlaying a narrowband transmission in a time slot used by said at least one user station.

14. The communication system of claim 13 wherein each of said time frames is about 10 milliseconds in duration, and each of said base station time slots and each of said user station time slots is about 416.7 microseconds in duration.

15. The communication system of claim 13 wherein said base station, in response to said spread spectrum transmissions received from said at least one user station, converts said user-to-base signal received from said at least one user station into a DECT format.

16. The communication system of claim 13 wherein said at least one user station, in response to spread spectrum transmissions received from said base station, converts said base-to-user signal received from said base station into a DECT format.

17. A communication system comprising:

a series of time frames in DECT (Digital European Cordless Telecommunication System) protocol for communication between a base station and a plurality of user stations, each of said time frames comprising a base station portion and a user station portion;

a plurality of base station time slots in said base station portion, during each of which said base station may transmit a base-to-user signal to one of said user stations, said base station including a chip sequence transmitter generator that produces a chips stream output, and a modulator to modulate a base station data stream with said chip stream output to provide rapid synchronization within DECT system timing constraints; and a plurality of user station time slots in said user station portion, during each of which one of said user stations may transmit a user-to-base signal to said base station, each of said user stations including a chip sequence transmitter generator that produces a chip stream output, and a modulator to modulate a user station data stream with said chip stream output to provide rapid synchronization within DECT system timing constraints;

wherein a subset of said plurality of user stations communicate with said base station in a time slot by sending and receiving code division multiplexed transmissions.

18. The communication system of claim 17 wherein each of said time frames is about 10 milliseconds in duration, and each of said base station time slots and each of said user station time slots is about 416.7 microseconds in duration.

19. The communication system of claim 17 wherein said base station, in response to said code division multiplexed transmissions received from a first one of said subset of user stations, converts said code division multiplexed data information received from said one user station into a DECT format.

20. The communication system of claim 17 wherein one of said subset of user stations, in response to said code division multiplexed transmissions received from said base station, converts said code division multiplexed data information received from said base station into a DECT format.

21. A communication system comprising:

a base station;

a plurality of frequency channels;

a plurality of user stations communicating with said base station over said frequency channels using time division multiplexing with DECT (Digital European Cordless Telecommunication System) protocol, whereby said base station transmits a first packet to each of said user stations in a first portion of a time frame and receives a second packet from each of said user stations in a second portion of said time frame, said first portion of said time frame divided into a plurality of base station time slots and said second portion of said time frame divided into a plurality of user station time slots;

means in said base station for spread spectrum transmitting to a first user station 388 data bits in one of said plurality of base station time slots, by modulating said data bits with a chip stream output produced by chipping means in said base station to produce a base-to-user spread spectrum signal that provides rapid synchronization within DECT system timing constraints;

a first spread spectrum receiver in said first user station, said first spread spectrum receiver having a correlator configured to despread said base-to-user spread spectrum signal for rapid synchronization within DECT system timing constraints;

means in said first user station for spread spectrum transmitting to said base station 388 data bits in one of said use station time slots, by modulating said data bits with a chip stream output produced by chipping means in said first user station to produce a user-to-base spread spectrum signal that provides rapid synchronization manner providing synchronization within DECT system timing constraints; and a second spread spectrum receiver in said base station, said second spread spectrum receiver having a correlator configured to despread said user-to-base spread spectrum signal for rapid synchronization within DECT system timing constraints.

22. The communication system of claim 21 wherein each of said base station time slots and each of said user station time slots is about 416.7 microseconds in duration.

23. The communication system of claim 21 wherein said time frame is about 10 milliseconds in duration.

24. The communication system of claim 21 wherein said base station and said first user station each comprises an M-ary spread spectrum transmitter.

25. A communication system comprising:

a spread spectrum transmitter operably coupled to a first interface, said first interface operably coupled to a Digital European Cordless Telecommunications System (DECT) Medium Access Control (MAC) layer;

a spread spectrum correlator operably coupled to a second interface, said second interface operably coupled to said MAC layer;

wherein said first interface converts a DECT data stream received from said MAC layer, said DECT data stream being formatted in accordance with the DECT time slot and DECT time frame structure, to a binary data stream provided to said spread spectrum transmitter;

said spread spectrum transmitter generating a spread spectrum signal in response to said binary data stream by modulating said binary data stream with a chip stream output of a chip sequence transmitter generator, said spread spectrum transmitter thereby capable of transmitting said spread spectrum signal in a rapid synchronization manner for providing synchronization within DECT system timing constraints;

said spread spectrum correlator capable of receiving and despreading said spread spectrum signal and generating said binary data stream in response thereto, said spread spectrum correlator further configured to correlate and despread said spread spectrum signal in a rapid synchronization manner for providing synchronization within DECT system timing constraints;

wherein said second interface converts said binary data stream received from said spread spectrum correlator to said DECT data stream provided to said MAC layer; and wherein said first interface and said second interface permits said MAC layer to function independently from said spread spectrum correlator and said spread spectrum transmitter.

26. The system of claim 25 wherein said spread spectrum correlator achieves data synchronization within each of said Digital European Cordless Telecommunications System (DECT) time slots in about 30 microseconds.

27. The system of claim 25 in which said spread spectrum transmitter transmits said spread spectrum signal in one of said Digital European Cordless Telecommunications System (DECT) time slots and having a frequency bandwidth occupying a plurality of DECT frequency channels.

28. The system of claim 27 in which said spread spectrum transmitter transmits said spread spectrum signal occupying a frequency bandwidth of three of said Digital European Cordless Telecommunications System (DECT) frequency channels.

29. The system of claim 25 in which said spread spectrum transmitter transmits said spread spectrum signal in a plurality of said DECT time slots, said spread spectrum signal occupying one of said Digital European Cordless Telecommunications System (DECT) frequency channels.

* * * * *

UNITED STATES PATENT AND TRADEMARK OFFICE
CERTIFICATE OF CORRECTION

PATENT NO. : 6,272,121 B1
DATED : August 7, 2001
INVENTOR(S) : Douglas G. Smith and Robert C. Dixon It is certified that error appears in the above-identified patent and that said Letters Patent is hereby corrected as shown below:

<u>Column 12,</u>
Line 23, the word "chin" should be changed to -- chip --.
Line 64, the word "lenght" should be changed to -- length --.

<u>Column 14,</u>
Line 5, the word "transmit" should be changed to -- transmitter --.

Signed and Sealed this

Twenty-sixth Day of February, 2002

Attest:

JAMES E. ROGAN
*Attesting Officer*     *Director of the United States Patent and Trademark Office*